(12) United States Patent
Rieger et al.

(10) Patent No.: US 8,365,007 B2
(45) Date of Patent: Jan. 29, 2013

(54) SYSTEM FOR CONTROLLING THE STATE OF A SWITCHED DIGITAL VIDEO SYSTEM AND METHOD THEREFOR

(75) Inventors: Remi Rieger, Charlotte, NC (US); Thomas L. Gonder, Tega Cay, SC (US)

(73) Assignee: Time Warner Cable, Inc., New York, NY (US)

( * ) Notice: Subject to any disclaimer, the term of this patent is extended or adjusted under 35 U.S.C. 154(b) by 779 days.

(21) Appl. No.: 12/556,840

(22) Filed: Sep. 10, 2009

(65) Prior Publication Data

US 2011/0061088 A1 Mar. 10, 2011

(51) Int. Cl.
*G06F 11/00* (2006.01)
(52) U.S. Cl. ............................................ 714/4.1; 714/25
(58) Field of Classification Search ........................ None
See application file for complete search history.

(56) References Cited

U.S. PATENT DOCUMENTS

| | | | | |
|---|---|---|---|---|
| 2008/0244667 | A1* | 10/2008 | Osborne | 725/94 |
| 2010/0162321 | A1* | 6/2010 | Bradley | 725/56 |
| 2010/0313230 | A1* | 12/2010 | Van Doorn et al. | 725/107 |
| 2010/0313236 | A1* | 12/2010 | Straub | 725/146 |

OTHER PUBLICATIONS

IneoQuest, "IQDialogue SDV Server", 2011.*
Cisco, "Switched Digital Video Status and Operations", 2009, Cisco Systems, Inc. Data Sheet, pp. 1-4.*
Cisco, "Cisco Switched Digital Video Collector", 2009, Cisco Systems, Inc. Data Sheet, pp. 1-2.*
Cisco, "Troubleshooting Switched Digital Video for System Release 2.8/3.8/4.3", 2008, 2012, pp. i-v, 1-112.*

* cited by examiner

*Primary Examiner* — Michael Maskulinski
(74) *Attorney, Agent, or Firm* — The Marbury Law Group, PLLC

(57) ABSTRACT

A system and method for dynamically configuring a switched digital video (SDV) system. An SDV server is configured to generate logs, including logs of program information, stream information and client information. A listener is configured to monitor the logs generated by the SDV server, generate state data indicative of a desired state of the SDV system, and generate state data indicative of an actual state of the SDV system. The listener compares the desired state data to the actual state data and determines whether the actual state data in view of the desired state data are indicative of an aberrant state of the SDV system. When the actual state data are indicative of an aberrant state of the SDV system, the listener determines a remedial action to change the operation of the SDV system and configures the SDV server to implement the remedial action.

20 Claims, 6 Drawing Sheets

SYSTEM FOR CONTROLLING THE STATE OF A SWITCHED DIGITAL VIDEO SYSTEM AND METHOD THEREFOR

BACKGROUND

FIG. 1 illustrates a typical hybrid-fiber-coax (HFC) cable system architecture. A headend 100 communicates with hub 105. Hub 105 comprises a cable modem termination system and switching/routing components. Hub 105 communicates with a node 110. Node 110 provides an interface between the fiber-based transport medium of the cable network (between the headend 100 and upstream side of node 110) and the coax-based medium (between the downstream side of node 110 and the video termination devices 115$i$-115$n$). As will be appreciated by those skilled in the art, FIG. 1 is a simplified schematic of a typical cable network architecture.

HFC cable systems have historically been "unswitched" distribution systems of video content. That is, each video termination device 115$i$-115$n$ connected to node 110 received all of the video channels broadcast by headend 100. Because many of these channels will not be actively viewed by a subscriber, the unswitched distribution of content is wasteful of bandwidth.

In a switched digital video (SDV) system, unwatched channels may be deleted from the broadcast stream. In order to accomplish this, the viewing state of each video termination device 115$i$-115$n$ is monitored over a two-way channel between the video termination device and the distribution hub connected to it. The video termination device sends a channel request signal back to the distribution hub. If a channel is not currently being transmitted on the coaxial line, the distribution hub may allocate a new QAM channel and, if allocated, transmits the new channel to the coaxial cable via the fiber optic node.

FIG. 2 illustrates the logical components of an SDV system. In an SDV system, a cable headend 205 comprises an SDV manager 210 and an SDV server 215, a hub 220 comprising an edge-QAM (quadrature amplitude modulation) modulator 225, and a video termination device 235 comprising an SDV client 240. A node 230 provides an interface between the fiber portion of the HFN and the coax portion of the network.

In a typical headend, content is received from multiple sources, including satellite, terrestrial over-the-air broadcast, fiber transport, storage media, and IP data networks. The receiving equipment for these sources uses various physical connections and interfaces.

As in unswitched systems, the QAM modulator 225 enables the transmission of a multiplex of digital streams via an RF carrier in an HFC spectrum channel. The digital streams may be composed of strictly MPEG transport packets or may contain IP packets as do QAM streams used for DOCSIS cable modem termination systems (CMTSs). The SDV system uses the QAM modulator 225 to request (join) and terminate (leave) IP multicasts and to transmit programs as MPEG transport packets in RF.

The SDV manager 210 governs access to content and network resources and allows sharing of those resources by various applications. The SDV server 215 uses a session setup protocol (SSP) to request from the SDV manager 210 shell sessions on a QAM signal feeding a given service group. The SDV manager 210 identifies available bandwidth on the service group QAM signal and provides shell-session space to the SDV server 215, thereby reserving bandwidth on the QAM modulator 225 for exclusive use by the SDV server 215. In the reply from the SDV manager 210, the SDV server 215 is given the control IP address of the QAM modulator 225 so that the SDV server 215 may directly control session bindings. Prior to granting QAM shell-session space (and thereby bandwidth) to the SDV server 215, the SDV manager 210 sets up the actual shell sessions on the selected QAM modulator 225 in order to prepare it for binding requests from the SDV server 215. The QAM modulator 225 is not told what server may request these bindings since they may come from a primary or a backup SDV server.

Since the SDV manager 210 is the master bandwidth controller in the system, it may need to recover bandwidth previously assigned to the SDV server 215. It may do so by sending a bandwidth reclamation request to the SDV server 215 for a specified service group. Upon receipt of such a request, the SDV server 215 initiates a QAM session teardown request for sufficient shell-session bandwidth to cover the reclamation.

The SDV server 215 is part session manager in that it directly receives and processes channel change requests received from the SDV client 240 that resides on video termination device 235. It is also part resource manager in that, for its allocation of QAM shell sessions, it can bind and thus assign those to real programs for transmission to the service groups.

The SDV server 215 receives channel change requests for switched content from the SDV client 240 to bind that content to a session on QAM modulator 225 feeding a service group associated with video termination device 235. The SDV server 215 responds to video termination device 235 with the frequency and program number where that content may be found. The SDV server 215 also fields channel change request messages for non-SDV broadcast channels in order to gather anonymous usage statistics and understand activity.

The SDV client 240 is a software component that is integrated in the resident application (navigation guide) of an SDV-enabled video termination device 235. The operation of the SDV client 240 is transparent to the user. The SDV client 240 enables the video termination device 235 to communicate to the SDV server 215 using an interface such as the SDV Channel Change Message Interface Specification (CCM).

The configuration of the SDV system is dynamic. The state of the SDV system at a particular point in time depends on a number of factors, including the program selection of members of each service group, the demands of each service group on the system resources, and the health of the system resources. The SDV server 215 is tasked with maintaining the state of the SDV system. A failure of the SDV system to respond to changes in the factors that affect the system configuration may result in subscriber dissatisfaction, inefficient operation and even catastrophic system failure.

SUMMARY

Embodiments provide systems and methods for monitoring the state of an SDV system and for reconfiguring the SDV system so as to maintain the SDV system in a state that is responsive to subscriber demands in near real-time.

DETAILED DISCLOSURE

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation schemes might use any constellation level (e.g. QAM-16, QAM-64, QAM-256 etc.) depending on details of a cable network. A QAM may also refer to a physical channel modulated according to said schemes. As this invention is not dependent on the modulation scheme chosen, other modulation schemes may also be used, such as OFDM, SDM, etc.

As used herein, the term "Service Group" refers to either a group of service users (e.g. subscribers) or the resources shared by them in the form of an entire cable RF signal or only the RF channels used to receive the service or otherwise treated as a single logical unit by the network for resource assignment.

As used herein, the term "server" refers to any computerized component, system or entity regardless of form which is adapted to provide data, files, applications, content, or other services to one or more other devices or entities on a computer network.

Figure 3:
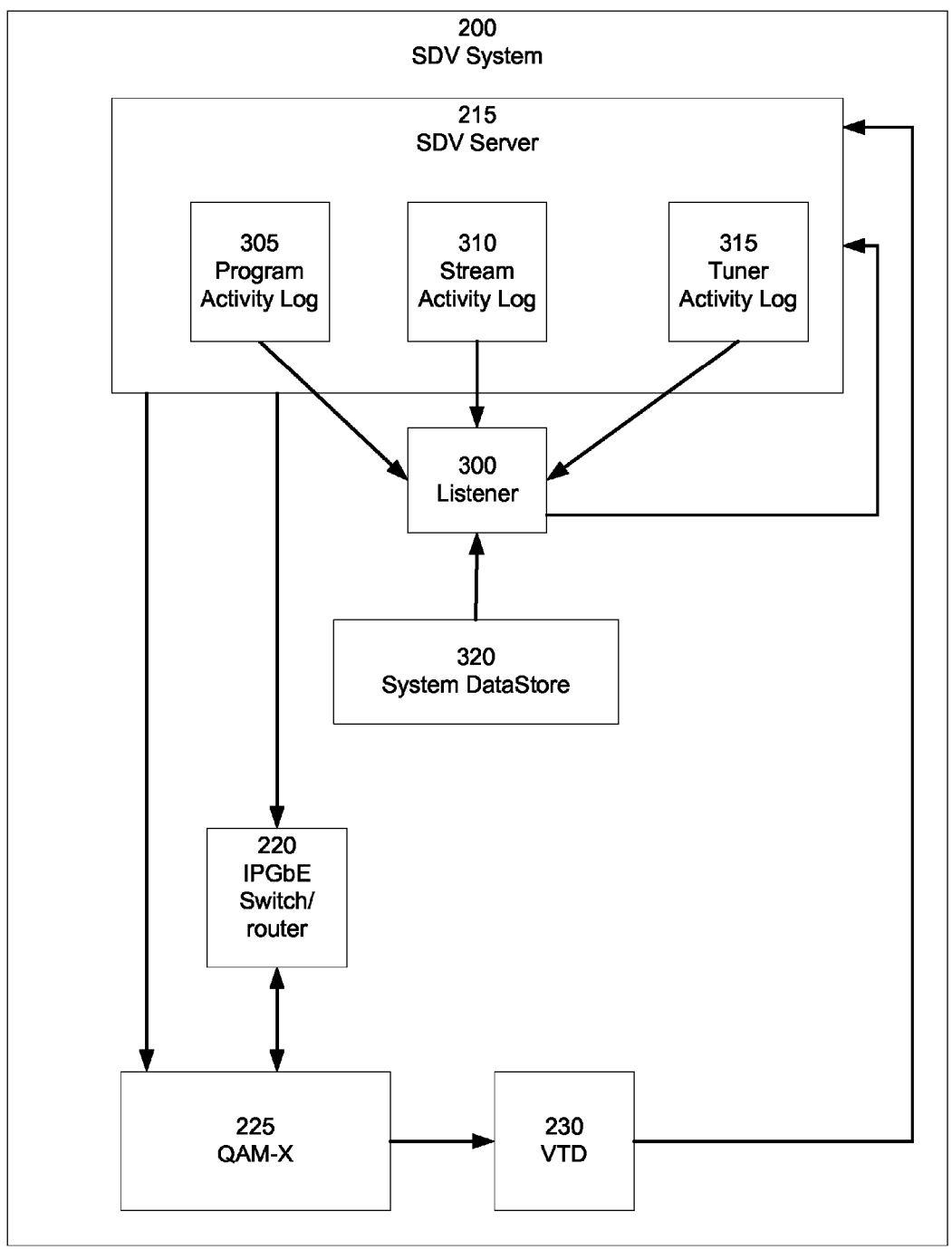
FIG. 3 is a block diagram illustrating an SDV system incorporating a listener according to an embodiment.

FIG. 3 is a block diagram illustrating an SDV incorporating a listener feature according to an embodiment.

In this embodiment a listener 300 may monitor logs produced by the SDV server 215. As illustrated in FIG. 3, the SDV server 215 generates a program activity log 305, a stream activity log 310 and a tuner activity log 315. However, this is not meant as a limitation. The listener 300 may monitor some or all of the data that is generated by the SDV server 215 that are indicative of a state of the SDV system 200 and its logical and physical components.

As illustrated in FIG. 3, the listener 300 may also monitor system datastore 320 for data that may be useful in exercising the decision functions of the listener 300 as further described below.

In an embodiment, a log entry represents specific transitions within the operations of the SDV server.

Table 1 illustrates the content of the program activity log 305 according to an embodiment hereof. The program activity log 305 provides information related to the specific programs (multicast streams) available within the SDV system 200 by binding a source ID and a source index to a specific multicast single program transport stream (SPTS). For example, the program activity log 305 as illustrated in Table 1 provides the binding of the source ID and source index to a specific multicast single program transport stream (SPTS) and indicates the refresh, addition, deletion and modification of programs from the SDV server.

Table 2 illustrates the contents of the stream activity log 310 according to an embodiment hereof. The stream activity log 310 provides the information related to the addition, deletion, and modification of streams from the SDV server perspective. For example, the stream activity log 310 as illustrated in Table 2 provides the allocation of a program to available bandwidth within the narrowcast spectrum and the following events: refresh, client add, un-requested add, modify, normal teardown, triage teardown, QAM communication failure, QAM reconcile failure, SDV server failure teardown, and other failures.

Table 3 illustrates the contents of the tuner activity log 315 according to an embodiment. The tuner activity log 315 provides the information related to SDV clients (see, FIG. 2, 240). For example, the tuner activity log 315 as illustrated in Table 3 provides change messages that are used to write tuner activity to the log for both switched and non-switched program selections. These messages may include the following events: initialization, SDV program, non-SDV program, aged program, slate in progress; slated; inactive, program not available, non-responder failed response, BW not available, QAM failure, message format failure, out of sync failure and other failures.

TABLE 1

PROGRAM ACTIVITY LOG FILE

| COLUMN | FORMAT | EXAMPLE | DESCRIPTION |
| --- | --- | --- | --- |
| DATE | YYYY/MM/DD | 2007/03/27 | Date of the log entry in local time. |
| TIME | HH:MM:SS | 00:30:12 | Time of the log entry in local time. |
| EVENT | Enumeration | 1 | Event code of the log entry:<br>0 - Refresh<br>1 - Add<br>2 - Modify<br>3 - Delete |
| SG_ID | Non-zero value | 123 | Service Group ID of the Program. |
| SOURCE | Non-zero value with dashed source index, if applicable | 1000<br>1000-1 | Source ID and Source Index of the program. If Source Index is used then the Source ID is followed with a dash with the Source Index value. |
| NAME | String, max 16 chars | HBO, CNN-1 | Name of the program. |
| RATE | Non-zero decimal value to two places | 3.75<br>15.00 | Capped bandwidth rate of the program stream in megabits per second (Mbps). |
| MCAST | Decimal Notation IP Address with colon UDP Port | 232.100.10.1:1000 | Multicast Destination Address and Port of the Source stream on the network. |
| SSM1 | Decimal Notation IP Address | 192.168.10.12 | Source Specific Multicast (SSM) Address # 1, if applicable. |
| SSM2 | Decimal Notation IP Address | 192.168.10.13 | Source Specific Multicast (SSM) Address # 2, if applicable. |

TABLE 1-continued

PROGRAM ACTIVITY LOG FILE

| COLUMN | FORMAT | EXAMPLE | DESCRIPTION |
| --- | --- | --- | --- |
| SSM3 | Decimal Notation IP Address | 192.168.10.14 | Source Specific Multicast (SSM) Address # 3, if applicable. |

TABLE 2

STREAM ACTIVITY LOG FILE

| COLUMN | FORMAT | EXAMPLE | DESCRIPTION |
| --- | --- | --- | --- |
| DATE | YYYY/MM/DD | 2007/03/27 | Date of the log entry in local time. |
| TIME | HH:MM:SS | 00:30:12 | Time of the log entry in local time. |
| EVENT | Enumeration | 1 | Event code of the log entry: 0 - Refresh 1 - Client Add 2 - Un-requested Add 3 - Modify 11 - Normal Teardown 22 - Triage Teardown 91 - QAM Comm. Failure 92 - QAM Reconcile Failure 93 - SDV Server Failure Teardown 99 - Other Failure |
| SG_ID | Non-zero value | 123 | Service Group ID of the Program. |
| STREAM | 20 char ASCII HEX | 0014227BBFB70000000 | Session ID of the Stream. This is the value exchanged during the shell session grant and is reused for various programs over time. |
| SOURCE | Non-zero value with dashed source index, if applicable | 1000 1000-1 | Source ID and Source Index of the program. If Source Index is used then the Source ID is followed with a dash with the Source Index value. |
| RATE | Non-zero decimal value to two places | 3.75 15.00 | Capped bandwidth rate of the program stream in megabits per second (Mbps). |
| NODE | Non-zero value | 125 | Node identifier value, if known. |
| TSID | Non-zero value | 3143 | Transport Stream ID (TSID) of the QAM carrier |
| FREQ | Non-zero value | 777 | Carrier frequency in MHz. |
| PN | Non-zero value | 1234 | MPEG Program Number (PN) of the stream. |
| TIMER | Non-zero value | 120 | Stream timer for this stream in minutes. This value is the time used to determine tuner aging and the interval of inactivity that makes a stream a candidate for stream reclamation. |

TABLE 3

TUNER ACTIVITY LOG FILE

| COLUMN | FORMAT | EXAMPLE | DESCRIPTION |
| --- | --- | --- | --- |
| DATE | YYYY/MM/DD | 2007/03/27 | Date of the log entry in local time. |
| TIME | HH:MM:SS | 00:30:12 | Time of the log entry in local time. |
| EVENT | Enumeration | 1 | Event code of the log entry: 0 - Init 1 - SDV (Switched) 2 - Non-SDV (Broadcast) 3 - Aged 4 - Slate In Progress 5 - Slated 6 - Inactive 7 - Program Not Available 8 - Non-responder (failed response) 91 - BW Not Available 92 - QAM Failure 93 - Message Format Failure 94 - Out of Sync Failure 99 - Other Failure |

TABLE 3-continued

TUNER ACTIVITY LOG FILE

| COLUMN | FORMAT | EXAMPLE | DESCRIPTION |
|---|---|---|---|
| SG_ID | Non-zero value | 123 | Service Group ID of the Program. |
| UID | Non-zero value with dashed tunerId | 123435671-0 | User ID. This is a unique (hashed) value of the SDV client MAC address followed by a dash and the tuner ID. |
| TUNER_USE | Non-zero value | 17 | Tuner Use field provided in the SDVProgramSelectRequest or SDVEventIndication. |
| SOURCE | Non-zero value with dashed source index, if applicable | 1000<br>1000-1 | Source ID and Source Index of the program. If Source Index is used then the Source ID is followed with a dash with the Source Index value. |
| STREAM | 20 char ASCII HEX | 0014227BBFB70000000 | Session ID of the Stream. This is the value exchanged during the shell session grant and is reused for various programs over time. |
| LUA | HH:MM:SS Blank if not applicable. | 00:29:17 | Last User Activity (LUA) timestamp. If multiple are sent within an active tuner period then only the last time is specified. Must be less than the TIME field specified above. LUAs received after the event shall be discarded. |
| LUA_CT | Non-zero value Blank if not applicable. | 1 | Last User Activity (LUA) Count if one or more LUAs are received within the event period. |
| PROTOCOL | Non-zero value | 3 | Client SDV protocol specified during the SDVInitRequest message. This 1 byte value defines the SDV Specification document used to implement the client software. Present for "Init" EVENT types only. |
| CLIENT | Non-zero value | 3 | Client enumeration specified during the SDVInitRequest message.<br>0x01 - SARA<br>0x02 - MDN<br>0x03 - ODN<br>0x04 - Motorola MDN<br>0x05 - Motorola ODN<br>0x06 - Motorola A25<br>0x07 - Passport - Scientific Atlanta<br>0x08 - Passport - Motorola<br>0xFF - Other<br>Present for "Init" EVENT types only. Blank if client does not send descriptor. |
| VERSION | Decimal version of 4 byte hex value, e.g. 02040110 == | 2.4.1.16 | Client version specified during the SDVInitRequest message. The 4-byte value represents the 4 dot version of the client software. This should not be confused with the SDV protocol version.<br>Present for "Init" EVENT types only. Blank if client does not send descriptor. |
| ATTRIBUTES | ASCII HEX | 0014227BBFB700000001 | Client Attribute descriptor. This tightly packed array of data defines the SDV client attributes, such as: encryption type, video decode, audio decode, HD capable, etc . . .<br>Present for "Init" EVENT types only. Blank if client does not send descriptor. |

The stream activity log 310 relates stream activity to a program within the program activity log 305 by referencing a common SOURCE value in SOURCE column at a particular time or within a period surrounding a particular time. The tuner activity log 315 relates tuner activity to stream activity recording the stream activity log 310 by a common STREAM value in a STREAM column. Switched programs are referenced in the program activity log 305 by the SOURCE column and into the stream activity log 310 by the STREAM column. Non-switched programs do not reference into the stream activity log 310 and may not be referenced in the program activity log 305.

In an embodiment, the structures of the program activity log 305, the stream activity log 310 and the tuner activity log 315 may be selected to improve data integrity with the logs and to allow data to be validated by the listener 300. By way of illustration and not by way of limitation, the logs may employ a checksum-like method for data integrity. In an embodiment, fields are duplicated within the logs to allow the listener 300 to perform system state assessments from a single table. By way of illustration and not by way of limitation, a RATE field is provided in both the program activity log 305 and the stream activity log 310. This allows the stream activity log 310 to be processed independently to provide service group bandwidth utilization.

In another embodiment, the logs may include an optional comments section for capturing additional context from within the SDV server 215 that allows other applications such as the listener 300 to insert comments to address implemented actions.

In another embodiment, event logging is tracked within a complete start to end cycle of a subscriber-viewing period thus allowing for visual and processing efficiencies when trolling the data logs.

In an embodiment, all columns of the logs are not required for all entries. By way of illustration and not by way of limitation, the CLIENT, VERSION, and ATTRIBUTES fields in the tuner activity log 315 may be provided only when the SDV client sends an SDVInitRequest message. In this embodiment, the log data is delimited using commas to assure that the data is written to the proper field.

In another embodiment, the program activity log 305 and the stream activity log 310 utilize a REFRESH EVENT TYPE field to permit those log files to convey the full state of the SDV system 200 without requiring refreshing all the log file fields from the beginning of the system.

In an embodiment, the log files are formatted as a comma separated value (CSV) file. Each file is encoded as normal ASCII files with a linefeed (LN-ASCII 10) between lines. The first line of the file is a header comprising the names of the columns for the activity log.

In an embodiment, an uncompressed activity log uses a naming convention as follows:
    sdv_<instance>_programsYYYYMMDD.log
    sdv_<instance>_streamsYYYYMMDD.log
    sdv_<instance>_tunersYYYYMMDD.log After a configurable period of time, log files are compressed. By way of illustration and not as a limitation, the compression utilizes a GZIP algorithm. Each compressed activity log shall use a naming convention as follows:
    sdv_<instance>_programsYYYYMMDD.gz
    sdv_<instance>_streamsYYYYMMDD.gz
    sdv_<instance>_tunersYYYYMMDD.gz The name comprises an <instance> field to differentiate the collection of data from multiple SDV server systems. The SDV manager 210 may accumulate these logs from its collection of SDV servers 215 and maintains these logs for a configurable period of time.

The SDV manager 210 may insert any appropriate value to differentiate its collection of SDV servers 215. The requirement is to allow all logs within the system to reside within a single file directory. This allows the SDV manager 210 to determine the appropriate time to retrieve logs from the system, avoiding prime time hours or when the system is under load.

In an embodiment, access to the files is limited to the SDV manager 210 within the system. The SDV manager 210 is closely linked to the SDV server and can manage the aggregation of all SDV server logs at the appropriate off peak time. The SDV manager 210 may provide FTP access to the logs for a configurable period of time. In an embodiment, log files reside in a single directory using a file naming convention described below to avoid collisions.

Using data from these three tables it is possible to re-create the operational allocation of programs within the available switched bandwidth and to determine individual SDV client 240 tuner status.

The state information of the SDV system 200 is monitored by the listener 300.

Figure 4:
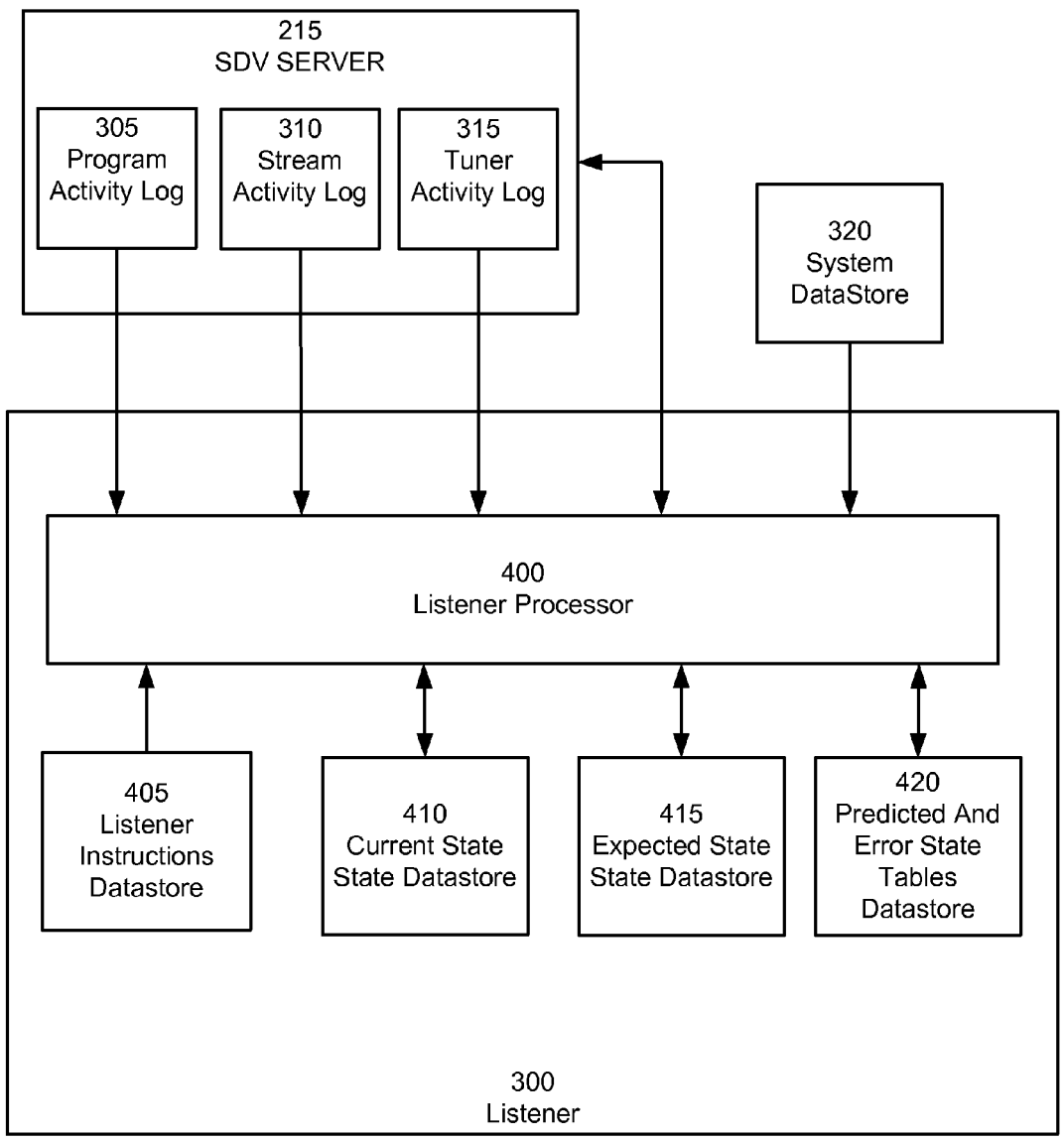
FIG. 4 is a block diagram illustrating elements of a listener according to an embodiment.

FIG. 4 is a block diagram illustrating elements of a listener according to an embodiment.

In an embodiment, the listener 300 comprises a listener processor 400, a listener instructions datastore 405, a current state datastore 410, an expected state datastore 415 and a predicted and error state tables datastore 420. The listener 400 communicates with the SDV server 215 and collects and analyzes data recorded in the program activity log 305, the stream activity log 310, and the tuner activity log 315 on a cycle and a real-time basis using listener processor 400. The listener processor 400 may also acquire data from the system datastore 320. In an embodiment, the system data store 320 may include subscriber information, billing information, and provisioning information. While system datastore 320 is illustrated as a single structure, it may include multiple distributed databases and storage devices that are accessible to the listener processor 400. By way of illustration and not as a limitation, the system datastore 320 may represent sources of billing system data, SNMP MIB data, and data from network monitoring tools.

In an embodiment, the listener 300 receives real time feeds of the log files from the SDV server 215. In one embodiment, the communications between the listener 300 and the SDV server 215 utilize UDP feeds. In this embodiment, the listener 300 "grabs" UDP transmitted packets from the SDV server 215 that provide real-time log information. The listener 300 remains an anonymous receiver device and no packet error correction is performed.

In another embodiment, the communications between the listener 300 and the SDV server 215 utilize TCP feeds. In this embodiment, the listener 300 "grabs" TCP transmitted packets from the SDV server that provide real-time log information. The listener is an identified receiver device with packet error correction.

In yet another embodiment, the log files are sent to the listener 300 from the SDV server 215 on a regular cycle time basis that is less than real-time. The SDV server 215 retains the master state of the system and the log files. The listener 300 will determine a real-time state of the SDV server from the log files. The listener 300 will remain in sync with the SDV server 215 by regularly comparing its state against the state of the SDV server 215.

The listener 300 comprises a listener instructions datastore 405. In an embodiment, the listener instructions datastore 405 comprises software instructions that when executed by the listener processor 400 cause the listener processor 400 to scan the program activity log 305, the stream activity log 310, and the tuner activity log 315, and to perform various operations on the log data.

In an embodiment, the listener processor 400 performs operations on the log data to isolate event patterns. By way of illustration, the event patterns may include the following:
    Errors (bandwidth, QAM, messages, tuner, non-responder)
    Excessive subscriber impacting events
    High/low bandwidth utilization
    Program lineup inefficiencies
    Inefficient channel packing
    Disparate/Malicious Behavior Identification
    Client activity/inactivity Client message responses (responses to slates, program not available)

Same program source changes (advertisement copies, bit rates & format changes)

Viewing behaviors

In another embodiment, the listener processor 400 performs operations on the log data to scan the data to determine trending information such as:

Bandwidth capacity

Individual program usage (type, format, usage)

Viewing behavior (time on channel, time viewing, channel surfing)

Multicast and unicast content

Tuners in use

In an embodiment, the listener processor 400 may also parse the data into sub-tables and categorize these sub-tables. By way of illustration and not by way of limitation, a sub-table may reflect "bandwidth-not-available" errors. The listener processor 400 may also enrich the log files with data from the system datastore 320. In still another embodiment, the listener processor 400 may create characteristics tables for service groups, programs and tuners. Characteristics tables are derived from the logs and may associate a particular trait to a service group or to one or more programs or tuners. By way of illustration and not by way of limitation, a service group that had strong viewing of sports programming could be labeled as having high sports consumption. This information may be used to optimize the channel lineup to improve efficiencies or for delivering targeted advertisements to appropriate service groups.

In another embodiment, the listener instructions datastore 405 comprises software instructions that when executed by the listener processor 400 cause the listener processor 400 to take corrective actions. By way of illustration and not by way of limitation, the listener processor may take the following actions to correct and/or to isolate errors or state inconsistencies:

Error isolation: The listener processor 400 identifies a block of errors and identifies the source of error to a session setup failure on a particular QAM port or frequency. The listener processor 400 issues corrective action to the SDV server 215 to isolate a faulty QAM channel or port thus eliminating further errors and sends alerts to outside monitoring tools for user action if necessary.

Ghost STBs: The listener processor 400 monitors STB MAC addresses and scans for movement of devices within service groups. When duplicates are encountered, the listener processor 400 issues corrective action to remove the MAC address from the moved service group.

Daily Trending Error Patterns: The listener processor 400 scans and analyzes daily cycle time logs for errors. The listener processor 400 analyzes the errors for patterns and initiates corrective action when errors are found. For example, the listener processor 400 may review daily blocking events, assess the blocking events and determine whether a corrective action to isolate certain fault causing tuners is appropriate, whether timeout values for existing streams should be reduced, determine whether programming in the pool should be reduced or rearranged, and/or determine whether the size of one or more service groups should be reduced.

Real Time Error correction: The listener processor 400 scans in real time the log files for errors, validates suspected errors and determines corrective actions: For example, when the service is exhibiting blocking errors, the listener processor 400 may determine whether the blocking errors are actual channel requests or surf-through events. When the errors are validated as channel requests, the server may initiate a corrective action by weighting the error against existing stream weighting and issuing a corrective action such as removing a lesser weighted stream or reducing time out values on all or certain streams.

Figure 1:
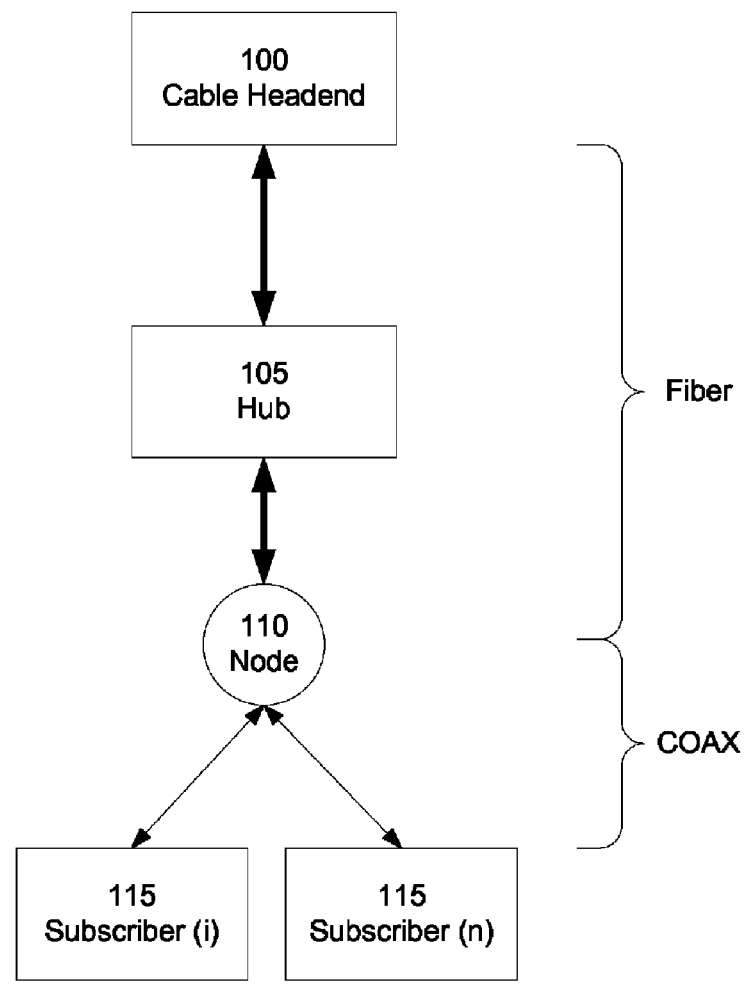
FIG. 1 is a block diagram illustrating a typical hybrid-fiber-coax (HFC) cable system architecture as known in the prior art.
Figure 2:
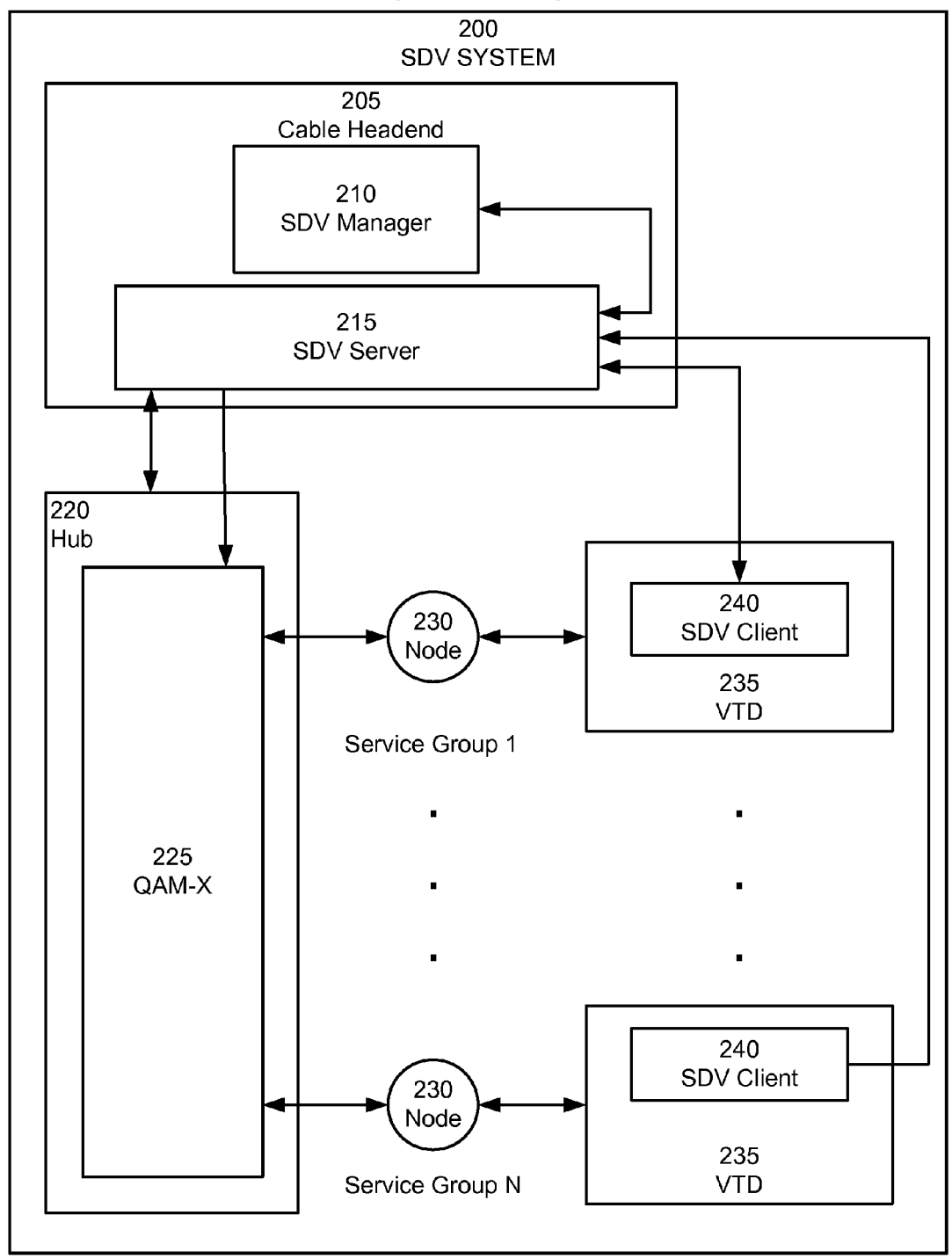
FIG. 2 is a block diagram illustrating the logical components of an SDV system as known in the prior art.

Malicious or disparate client behavior: The listener processor 400 identifies an SDV client (FIG. 2, 240) whose behavior is atypical and causing harm to the SDV system (FIG. 2, 200). The listener processor 400 may quarantine that client and isolate it from the system so as to prevent that client from further harming the service. For example, the SDV client 240 may be corrupted and may send excessive messaging such as multiple channel requests without releasing a previous channel. This may cause the SDV system 200 to falsely initiate video streams. Under such circumstances, the SDV client 240 may consume the available bandwidth and may cause denied programming messages for valid stream requests.

Non-responder client behavior: The listener processor 400 flags a non-responding SDV client (FIG. 2, 240) and alters program lineups of the service groups to reflect the programming that the non-responder would normally tune to. The listener processor 400 may also isolate and flag a nonresponder client and issue downstream commands to reboot that client or alert other components in the network of the client's status.

Excessive subscriber impacting events: The listener processor 400 determines the cause, issues corrective action and optimizes. For example, a subscriber, such as a bar or gym, might have the same channel on for a long period of time without initiating a user activity. Such a stream would normally time out after a few hours and would require a user action to reinstate the stream as active. The listener processor 400 may identify this behavior and issue a corrective action to the SDV server 215 to lengthen the timeout value. The listener processor 400 may then monitor the situation over time and optimize the timeout value to minimize subscriber-impacting events.

Capacity errors: The listener processor 400 issues corrective actions to the server when capacity limitations are being reached. For example, the listener processor 400 may issue a defragmentation command, poll users for activity, reduce timeout values, switch users to lower bit rate programming, and switch viewers to lower picture definitions.

Stream ranking: The listener processor 400 creates a stream ranking based on trending, client characteristics and other derived information of streams in use. The weighting will allow the listener processor 400 to rank the stream in service and establish a priority for corrective actions. For example, the ranking may be used to cull users as capacity limitations are reached. The listener processor 400 will be able to intelligently issue commands to the SDV server 215 as to the order in which to tear down certain streams.

Disparate SDV server behavior: The listener processor 400 maintains an expected state of the server. If the actual state of the SDV server 215 deviates greatly, the listener processor 400 may issue a corrective action to a backup server to take over the function of the disparate behavior SDV server 215.

In another embodiment, the listener instructions datastore 405 comprises software instructions that when executed by the listener processor 400 cause the listener processor 400 to take actions to improve operating efficiencies. By way of illustration and not by way of limitation, the listener processor may take the following actions:

Trigger for Optimization: The listener processor 400 deterministically trends capacity demands and marks shifts in capacity to implement optimization messaging to the SDV server 215.

Bandwidth Optimization: The listener processor 400 issues corrective action to optimize program lineups as to their delivery mode (SDV or Broadcast). For example, the listener processor 400 may change the channel states to SDV or Broadcast by service groups to account for different viewing patterns or to maximize advertising reach. This makes best use of SDV efficiency and overall bandwidth capacity.

Service Group Optimization: The listener processor 400 identifies service groups where the tuners exhibit disparate behavior versus uniform behavior. The listener processor 400 may reorganize service groups to create a more stable combination of tuners.

Picture Quality Optimization: The listener processor 400 issues a command to the SDV server to upgrade streams to higher definitions or higher bit rates for a better picture quality when capacity availability increases.

Unicast delivery optimization: The listener processor 400 identifies tuners in a unicast mode. The listener processor 400 may send a command to the SDV server 215 to change the state of the service to an optimized unicast service for delivery of enhanced services such as instant channel change and targeted advertisements. The listener processor 400 may also instruct the SDV server 215 to move multicast viewers to a dedicated unicast service within the capacity limits for delivery of enhanced services to a broader group of customers when capacity availability increases.

In an embodiment, the log data may process to identify patterns of data that occur in a near real-time time window or that are projected to occur at a time in the future. For example, the listener processor 400 may determine that a pattern of data is indicative of a current problem with a QAM. The listener processor 400 may also determine that the problem is likely to get worse under a variety of circumstances. For example, patterns of data may be indicative of a trend indicating that the QAM failures will occur with increasing frequency or that the QAM failures will increase when programming shifts from one sport season to another.

In an embodiment, the patterns of data may be expressed as state data and saved in the datastores 410, 415, and 420. By way of illustration and not by way of limitation, state data may include a parameter value, a rate of change of a value, and a sensitivity of a value to another value. These state data are dynamic to the extent they are functions of dynamic elements within the SDV system 200. The listener 300 adjusts to these changing states by adjusting the measures it uses to determine that an event or a trend in the state data requires that a corrective measure be taken.

In an embodiment, the listener instructions datastore 405 may include software instructions that cause the listener processor 400 to compute actual state measures and desired state measures and to determine that an "aberrant state" exists when the actual state measures differ from the desired state measures by a predetermined amount. The listener instructions datastore 405 may further include software instructions that cause the listener processor 400 take an action to rectify the aberrant state. As previously discussed, the aberrant state may be determined from patterns of behavior indicative of an event (a hard failure of a system component) or from patterns of behavior indicative of a trend that may result in the system failing to operate or operating in an inefficient manner in the future. The listener 300 may take appropriate action as previously described.

Figure 5:
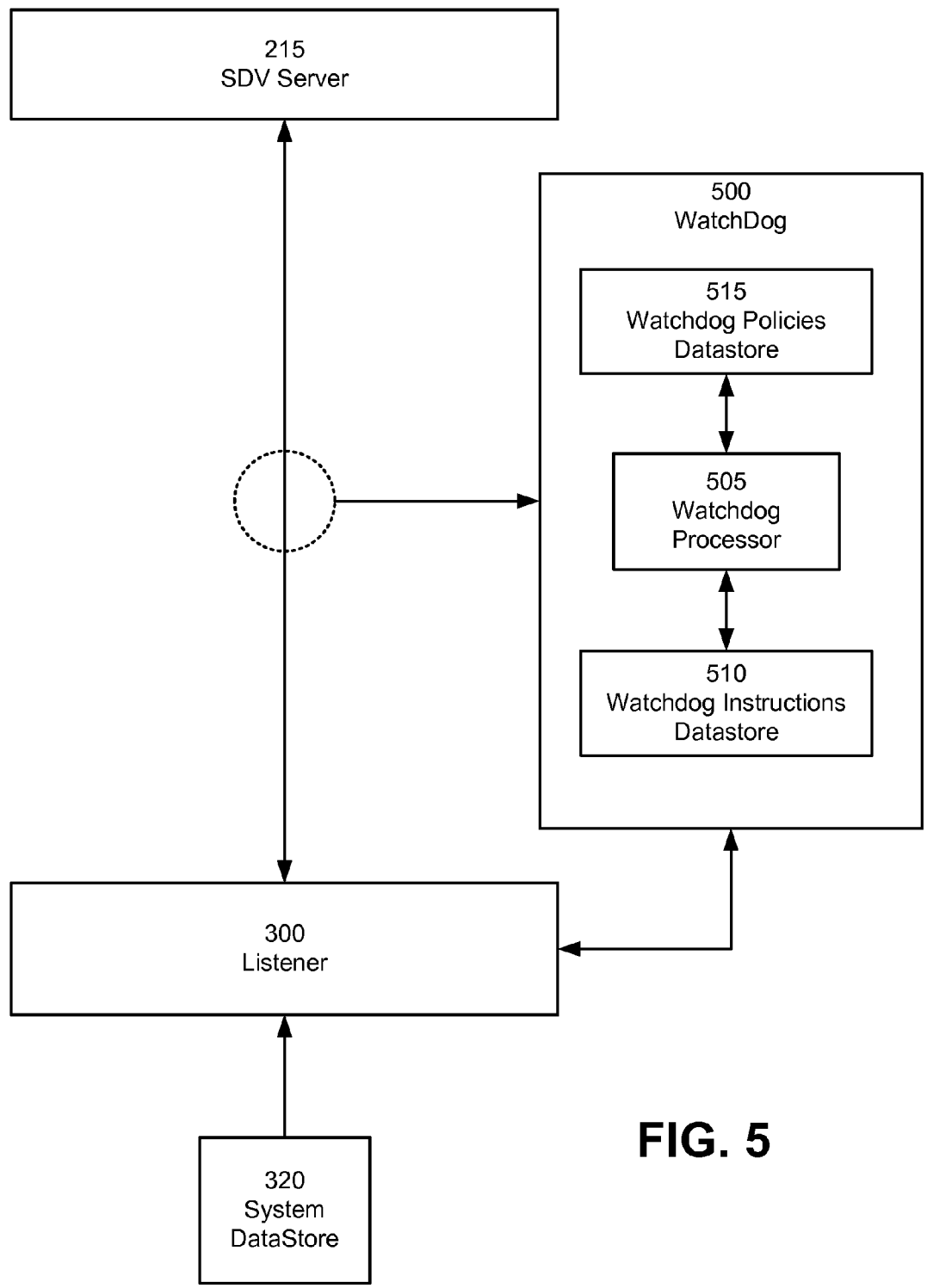
FIG. 5 is a block diagram illustrating a "watch dog" operating in conjunction with a listener according to an embodiment.

FIG. 5 is a block diagram illustrating a "watchdog" operating in conjunction with a listener according to an embodiment.

In an embodiment, an SDV "watchdog" 500 comprises a watchdog processor 505, a watchdog instructions datastore 510, and watchdog policies datastore 515. The instructions from the watchdog instructions datastore cause the watchdog processor 505 to monitor the messages and data exchanges between listener 300 and SDV server 215. The SDV watchdog processor 505 also compares the state of SDV server 215 with the predicted state of SDV server 215 maintained by listener 300.

In an embodiment, SDV watchdog processor 505 applies service polices from watchdog policies datastore 515 to the operation of the listener 300. For example, based on the degree of synchronicity between the actual state of the SDV server 215 and the state as predicted by the listener 300, the SDV watchdog processor 505 may enable the listener 300 to implement aggressive behavioral changes to the operation of the SDV server 215 or limit such operational changes to moderate or no behavioral changes. With the addition of the SDV watchdog 500, the operation of the listener 300 adapts to the stability and predictability of the state of the SDV server 215.

In another embodiment, when the actual state of the SDV server 215 and the state as predicted by the listener 300 diverge, the SDV watchdog processor 505 may implement policies from watchdog policy datastore 515 to disallow or override conflicting messages that may be harmful to the service. The SDV watchdog processor 505 may assess the divergence between states by simulating the effect of the messaging against the actual state prior to implementation of such message. For example, the listener 300 may issue anticipatory channel teardown messages based on the predicted state that the SDV server is out of bandwidth. The SDV watchdog processor 505 may review real-time activity and make the determination if the teardown messages would cause more harm than good. For instance, the listener action could be correct in the majority of instances as it is based on historical performance; however, in that particular instance the SDV server 215 might have atypical viewership that does not conform to the model of past behavior. The SDV watchdog processor 505 can identify the divergence and disallow the listener messages.

Figure 6:
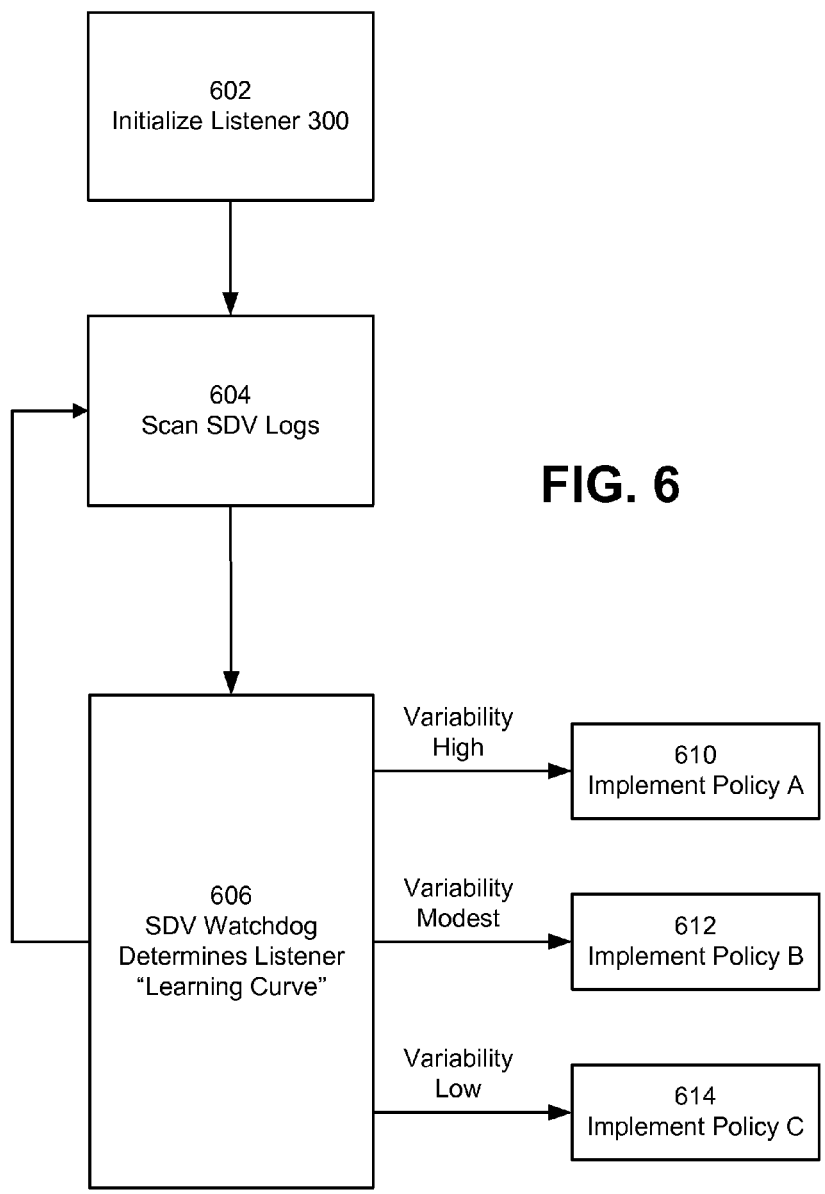
FIG. 6 is a block diagram illustrating a learning process of a listener according to an embodiment.

In an embodiment, a listener 300 "learns" to identify stable and aberrant states of an SDV system 200 by monitoring the SDV log files. FIG. 6 is a block diagram illustrating a learning process of a listener 300 according to an embodiment. The listener 300 is initialized (block 602). At this point in time, no data have been entered into the current state state datastore 410, the expected state state datastore 415, and the predicted and error state datastore 420. The listener processor executes instructions in instructions datastore 405 that cause the listener processor 400 to scan the program activity log 305, the stream activity log 310, and the tuner activity log 315, and to perform operations on the log data to isolate patterns of behavior of the SDV system 200 and its components (block 604). The patterns of behavior are expressed as state data and saved in the datastores 410, 415, and 420.

A watchdog processor 505 monitors the learning process of the listener 300 by measuring the reliability of the state data saved in the datastores 410, 415, and 420 (block 606). By way of illustration and not by way of limitation, the watchdog processor 505 may evaluate a rate of change of one or more selected state data elements, a variability of one or more selected state data elements, or a correlation between one or more selected state data elements in the current state datastore 410 to determine where the listener 300 is on the learning curve of listener (block 606).

The watchdog processor 505 may impose policies on the operation of the listener 300 that are related to the level of "training" achieved by the listener 300. For example, when the variability of a selected state data element is high, the watchdog processor 505 may implement a policy A (block 610) that restricts the ability of the listener 300 to directly affect the operation of the various components of the SDV system 200. By way of illustration and not by way of limitation, the listener 300 may be permitted to issue warnings but not dynamically affect the operation of a component of the SDV system 200. When the variability of a selected state data element is moderate, the watchdog processor 505 implements a policy B (block 612) that permits the listener 300 to exercise control over certain operations of selected components of the SDV system. When the variability of a selected state data element is low, the learning phase of the listener 300 is determined by the watchdog processor 505 to be completed, and the watchdog processor 505 may implement a policy C (block 614) that allows the listener 300 to exercise full control over the SDV system 200, subject to the general policies of the SDV watchdog 500 described above.

As illustrated in FIG. 6, the SDV watchdog 500 continuously monitors the state data elements produced by the listener 300. In an embodiment, a change in the configuration of one or more components of the SDV system 200, either by the listener 300, by the operator or by a failure of a component of the SDV system 200, may cause the listener 300 to reenter the training sequence.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of the computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for dynamically configuring a switched digital video (SDV) system comprising:
   configuring an SDV server to generate logs, wherein the logs comprise program information, stream information and client information;
   configuring a listener processor to:
   monitor the logs generated by the SDV server;
   generate state data indicative of a desired state of the SDV system;
   generate state data indicative of an actual state of the SDV system;
   compare the desired state data to the actual state data;
   determine whether the actual state data in view of the desired state data are indicative of an aberrant state of the SDV system;
   determine a remedial action to change the operation of the SDV system when the actual state data are indicative of an aberrant state of the SDV system; and
   configure the SDV server to implement the remedial action.

2. The method of claim 1 further comprising configuring the listener processor to:
   determine whether the actual state data in view of the desired state data are indicative of the SDV system entering an aberrant state at a future time;
   determine a remedial action to change the operation of the SDV system when the actual state data are indicative of the SDV system entering an aberrant state at a future time; and
   configure the SDV server to implement the remedial action.

3. The method of claim 1, wherein the remedial action is selected from the group consisting of reallocating resources of the SDV system, quarantining a component of the SDV system, and issuing an alert message.

4. The method of claim 1, wherein the program information is maintained in a program activity log and wherein the program information comprises state, descriptive, and routing information for programs managed by the SDV server.

5. The method of claim 1, wherein the stream information is maintained in a stream activity log, and wherein the stream information comprises state and descriptive information for video streams managed by the SDV server.

6. The method of claim 1, wherein the client information is maintained in a tuner activity log and wherein client information comprises state and descriptive information for tuners controlled by the SDV server.

7. The method of claim 1, wherein the SDV logs utilize a structure that relates the SDV logs via common fields.

8. The method of claim 1 further comprising configuring a watchdog to:
monitor the remedial action determinations of the listener processor;
generate state data indicative of a predicted state of the SDV system if the remedial action is implemented;
compare the predicted state data to the desired state data; and
apply a service policy to the operation of the listener processor when the predicted state data differs from the desired state data by a pre-determined threshold.

9. The method of claim 1, comprising configuring a watchdog to:
monitor the remedial action determinations of the listener processor;
generate state data indicative of a predicted state of the SDV system if the remedial action is implemented;
compare the predicted state data to the desired state data;
apply a first service policy to the operation of the listener processor when the difference between the predicted state data and the desired state data is greater than or equal to a first threshold and less than a second threshold; and
apply a second service policy to the operation of the listener processor when the difference between the predicted state data and the desired state data is greater than or equal to the second level.

10. The method of claim 9, wherein the second service policy may preclude the configuration of the SDV server by the listener processor.

11. A system for dynamically configuring a switched digital video (SDV) system comprising:
an SDV server device, wherein the SDV server device is configured to generate logs and wherein the logs comprise program information, stream information and client information;
a listener device comprising a listener processor and a listener memory device, wherein the memory device stores computer readable instructions that when executed by the listener processor cause the listener device to perform operations comprising:
monitoring the logs generated by the SDV server device;
generating state data indicative of a desired state of the SDV system;
generating state data indicative of an actual state of the SDV system;
comparing the desired state data to the actual state data;
determining whether the actual state data in view of the desired state data are indicative of an aberrant state of the SDV system;
determining a remedial action to change the operation of the SDV system when the actual state data are indicative of an aberrant state of the SDV system; and
configuring the SDV server device to implement the remedial action.

12. The system of claim 11, wherein the listener memory device further stores computer readable instructions that when executed by the listener processor cause the listener processor to perform operations comprising:
determining whether the actual state data in view of the desired state data are indicative of the SDV system entering an aberrant state at a future time;
determining a remedial action to change the operation of the SDV system when the actual state data are indicative of the SDV system entering an aberrant state at a future time; and
configuring the SDV server device to implement the remedial action.

13. The system of claim 11, wherein the remedial action is selected from the group consisting of reallocating resources of the SDV system, quarantining a component of the SDV system, and issuing an alert message.

14. The system of claim 11, wherein the program information is maintained in a program activity log and wherein the program information comprises state, descriptive, and routing information for programs managed by the SDV server device.

15. The system of claim 11, wherein the stream information is maintained in a stream activity log, and wherein the stream information comprises state and descriptive information for video streams managed by the SDV server device.

16. The system of claim 11, wherein the client information is maintained in a tuner activity log and wherein client information comprises state and descriptive information for tuners controlled by the SDV server device.

17. The system of claim 11, wherein the SDV logs utilize a structure that relates the SDV logs via common fields.

18. The system of claim 11 further comprising a watchdog processor and a watchdog memory device, wherein the memory device stores computer readable instructions that when executed by the watchdog processor cause the watchdog processor to perform operations comprising:
monitoring the remedial action determinations of the listener processor;
generating state data indicative of a predicted state of the SDV system if the remedial action is implemented;
comparing the predicted state data to the desired state data; and
applying a service policy to the operation of the listener processor when the predicted state data differs from the desired state data by a pre-determined threshold.

19. The system of claim 11 further comprising a watchdog processor and a watchdog memory device, wherein the memory device stores computer readable instructions that when executed by the watchdog processor cause the watchdog processor to perform operations comprising:
monitoring the remedial action determinations of the listener processor;
generating state data indicative of a predicted state of the SDV system if the remedial action is implemented;
comparing the predicted state data to the desired state data;
applying a first service policy to the operation of the listener processor when the difference between the predicted state data and the desired state data is greater than or equal to a first threshold and less than a second threshold; and
applying a second service policy to the listener processor when the difference between the predicted state data and the desired state data is greater than or equal to the second level.

20. The system of claim 19, wherein the second service policy may preclude the configuration of the SDV server device by the listener processor.

* * * * *